(12) United States Patent
Nunez

(10) Patent No.: US 6,654,737 B1
(45) Date of Patent: Nov. 25, 2003

(54) HYPERTEXT-BASED DATABASE ARCHITECTURE

(75) Inventor: Chris Nunez, Trabuco Canyon, CA (US)

(73) Assignee: Centor Software Corp., Irvine, CA (US)

(*) Notice: Subject to any disclaimer, the term of this patent is extended or adjusted under 35 U.S.C. 154(b) by 0 days.

(21) Appl. No.: 09/577,271

(22) Filed: May 23, 2000

(51) Int. Cl.[7] ............................................. G06F 17/30
(52) U.S. Cl. ................................................. 707/3; 707/4
(58) Field of Search .......................... 707/3, 5, 10, 102, 707/500, 203, 513, 104.1, 501.1, 515, 517; 345/760; 711/137

(56) References Cited

U.S. PATENT DOCUMENTS

| | | | |
|---|---|---|---|
| 5,357,631 A | 10/1994 | Howell et al. | 707/203 |
| 5,649,186 A | 7/1997 | Ferguson | 707/10 |
| 5,649,218 A | 7/1997 | Saito | 707/513 |
| 5,708,806 A | 1/1998 | De Rose et al. | 707/104.1 |
| 5,708,825 A | 1/1998 | Sotomayor | 707/501.1 |
| 5,761,684 A | 6/1998 | Gibson | 707/515 |
| 5,835,712 A * | 11/1998 | DuFresne | 707/10 |
| 5,848,410 A | 12/1998 | Walls et al. | 707/102 |
| 5,903,902 A | 5/1999 | Orr et al. | 707/517 |
| 5,920,859 A * | 7/1999 | Li | 707/10 |
| 5,973,696 A | 10/1999 | Agranat et al. | 345/760 |
| 5,983,324 A | 11/1999 | Tietjen et al. | 711/137 |
| 5,987,480 A | 11/1999 | Donohue et al. | 707/501.1 |
| 6,003,046 A * | 12/1999 | Nielsen | 707/500 |
| 6,014,678 A | 1/2000 | Inoue et al. | 707/501.1 |
| 6,026,474 A | 2/2000 | Carter et al. | 707/10 |
| 6,067,552 A * | 5/2000 | Yu | 707/5 |
| 6,122,647 A * | 9/2000 | Horowitz et al. | 707/3 |
| 6,212,530 B1 * | 4/2001 | Kadlec | 707/102 |
| 6,356,897 B1 * | 3/2002 | Gusack | 707/10 |

* cited by examiner

*Primary Examiner*—Diane D. Mizrahi
*Assistant Examiner*—Yicun Wu
(74) *Attorney, Agent, or Firm*—Brown Raysman Millstein Felder & Steiner LLP (57) ABSTRACT

A database which consists of HTML, XML or other standard-format, hypertext documents is disclosed. For each "record" in the database there is a master document and multiple related documents, called "view documents." The view documents are related to the master document and may have a subset of the data of the master document. The view documents are generally created at the same time as the master document. The master document and view documents are revised by the DBMS together. The view documents are based upon pre-defined templates. The view documents provide alternative views of the data in the master document, and may be tailored to the user or class of user. Thus, each "record" in the database is actually one or more files. The "database" is formed from a directory tree of these files, structured in a pre-defined and controlled manner.

30 Claims, 9 Drawing Sheets

HYPERTEXT-BASED DATABASE ARCHITECTURE

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates to structure, organization and operation of database management systems (DBMSes).

2. Description of Related Art

Every organization that attempts to develop and maintain an electronic information system today is faced with a tremendous challenge. It is widely known that 90% of the world's information is stored in the form of emails, faxes, reports and word processing documents. The remaining 10% is stored in spreadsheets and databases. The 90% portion is considered "un-structured" and "chaotic" and cannot be easily modeled using the "row and column" format of spreadsheets and databases.

However, with the invention of the Internet and its related "tag languages" like HTML (Hyper-Text Markup Language) and XML (Extensible Markup language) unstructured information can now be more easily modeled because documents can be written in these new tag languages and the "mission critical" data in these documents can be identified with common tags. By blending markup languages with software that can operate on the data "between the tags," a new information type is emerging called "semi-structured." Today's DBMSes are not believed to have the capability to manage "semi-structured" information.

Conventional DBMSes may be of several varieties. These include relational database management systems, SGML-based database management systems, and text-based database management systems.

Conventional relational database management systems have their benefits and drawbacks. Conventional RDBMSes are generally robust, have strong legacy connections, and are a proven technology. On the other hand, they are generally very expensive and not web-ready.

More recently, DBMSes based upon SGML have been developed. These DBMSes are generally flexible, robust, and include good publishing tools. However, they are also very-very expensive, and the skills to develop and manage them are hard to find.

Many DBMSes are based upon full text concepts. These DBMSes are generally flexible, low in cost, and utilize proven technology. However, they generally are not robust, and not web-ready.

Another type of DBMS diverged from the "single-file" type of DBMS. This type of DBMS stores each record of the database in a separate HTML file. Because it lacked flexibility, however, especially in its ability to satisfy the needs of large institutions, this DBMS was inadequate.

On the other hand, the benefit of hyperlinked documents distributed across and accessible from a network has become apparent. A "hyperlink" is defined as a point-and-click mechanism implemented on a computer which allows a viewer to link (or jump) from one screen display to where a topic is referred, to other screen displays where more information about that topic exists. These hyperlinked screen displays can all be of portions of the media data (media data can include, e.g., text, graphics, audio, video, etc.) from a single data file, or can be portions of a plurality of different data files; these can be stored in a single location, or at a plurality of separate locations. The hyperlink is the combination of a display element or a (generally visual) indication that a hyperlink is available for a particular hyperlink source, and a computer program which finds and displays the hyperlink destination. A hyperlink thus provides a computerassisted way for a human user to efficiently jump between various locations containing information which is somehow related.

The term "document" is defined in a broad sense as text and other information stored in a single computer file. Documents include everything from simple short text documents to large computer multi-media databases.

The Internet, and particularly the World Wide Web, has brought hyperlinking to use over networks. A network is a collection of communicatively coupled computers. The Internet is a international network comprised of many heterogeneous sub-networks which link thousands of computers which have millions of users, many of whom are authors. The World Wide Web (sometimes simply called "the Web") is an interface and communications protocol used to make the Internet easier to use.

Nearly all DBMSes are client-server oriented, and are installed and operative on an operating system in conjunction with a file system. A computer operating system represents a collection of computer programs or routines which control the execution of application programs and that may provide services such as resource allocation, scheduling, input/output control, and data management. Most operating systems store logical units of data in files, and files are typically grouped in logical units of folders. Folders are themselves files which identify the files assigned to them and a folder can store other folders. Folders are sometimes also referred to as directories. An interrelated collection of files is called a file system.

Most file systems have not only files, but also data about the files in the file system. This data typically includes time of creation, time of last access, time of last write, time of last change, file characteristics (e.g., read-only, system file, hidden file, archive file, control file), and allocation size.

Most operating systems are designed to shield applications from direct interaction with the hardware which actually store file systems. File systems typically are stored in mass storage devices. A mass storage is a device having a large storage capacity, and may be read-write (e.g., a hard disk drive) or read-only (e.g., a CD-ROM drive). Some mass storage devices, for example RAID systems, comprise a collection of mass storage devices. Mass storage devices also typically have the quality of non-volatility.

The storage space of a mass storage device is logically divided into one or more logical disks also known as partitions. Conversely, drivers are available which will treat a group of mass storage devices as a single logical disk. In Windows operating systems, each logical disk is served by a disk device driver which also holds a drive designation, C:, D:, E,. etc. Windows operating systems do not limit logical disks being part of a mass storage device. For example, a RAM disk uses part of the computer's operating memory as a storage of its sectors.

The task of interfacing applications to the contents of a logical disk is assigned to a file system driver. A file system driver is a collection of function routines and file management structures that perform various tasks related to files and folders stored in logical disks. The function routines of a file system driver are used to open specified files, read specific blocks of data, write specific blocks of data, and close files. A file system driver is a significant portion of an operating system. File system drivers uses the services of a disk device driver to read sectors, translate sector data and give the user lists of files stored on the hard disk drive.

The structure of data stored in a logical disk is file system-dependent. For example, the FAT file system requires a logical disk to have a boot sector that describes location of File Allocation Tables (FAT) sectors and root directory sectors within this disk. Other file systems, such as NTFS, HPFS, etc. operate with different data structures and are incompatible with the structures of other file systems.

Conventional database management systems store records in one file, or in a few files in a single folder. As the amount of data to be stored in a database increases, the records are usually logically divided into more files. The location of the files is typically based upon convenience (e.g., all in the same folder) and accessibility. Accessibility usually considers speed of the underlying hardware, operating system, file system and communication paths.

SUMMARY OF THE INVENTION

In accordance with the present invention, the database consists of HTML, XML or other standard-format, hypertext documents. For each "record" in the database there is a master document and multiple related documents, called "view documents." The view documents are related to the master document and may have a subset of the data of the master document. The view documents are generally created at the same time as the master document. The master document and view documents are revised by the DBMS together. The view documents are based upon pre-defined templates. The view documents provide alternative views of the data in the master document, and may be tailored to the user or class of user. Thus, each "record" in the database is actually one or more files. The "database" is formed from a directory tree of these files, structured in a pre-defined and controlled manner.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

The System of the Invention

Figure 1:
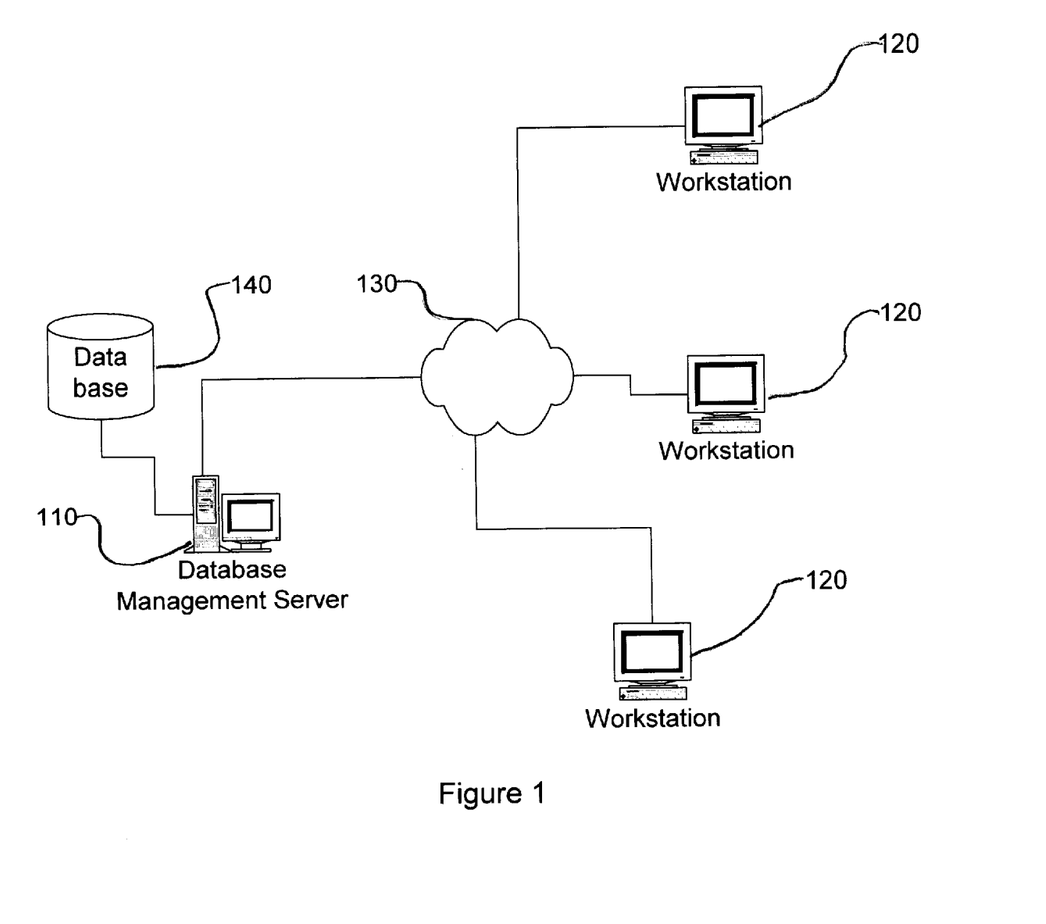
FIG. 1 is a block diagram of a client-server computer system.

Referring now to FIG. 1, there is shown a block diagram of a client-server computer system. The client server computer system comprises a database management server 110, plural workstations 120 and a network 130. The database management server 110 comprises software operating on one or more computers which maintains and controls access to a database 140. The database management server 110 may operate on a single computer, or may operate on plural computers in a collaborative fashion. The database 140 may be stored on the same computer as the database management server 130, or it may be stored on one or more other computers and storage devices, for example in a distributed fashion. The devices storing the database 140 may be directly connected to the computer operating the database management server 130, or may be connected via a network such as network 130. The workstations 120 comprise client computers which route commands either to their local operating systems or to a network interface adapter for processing and transmission on the network 130. The network 130 comprises a data transport between the database management server 110 and workstations 120.

Figure 2:
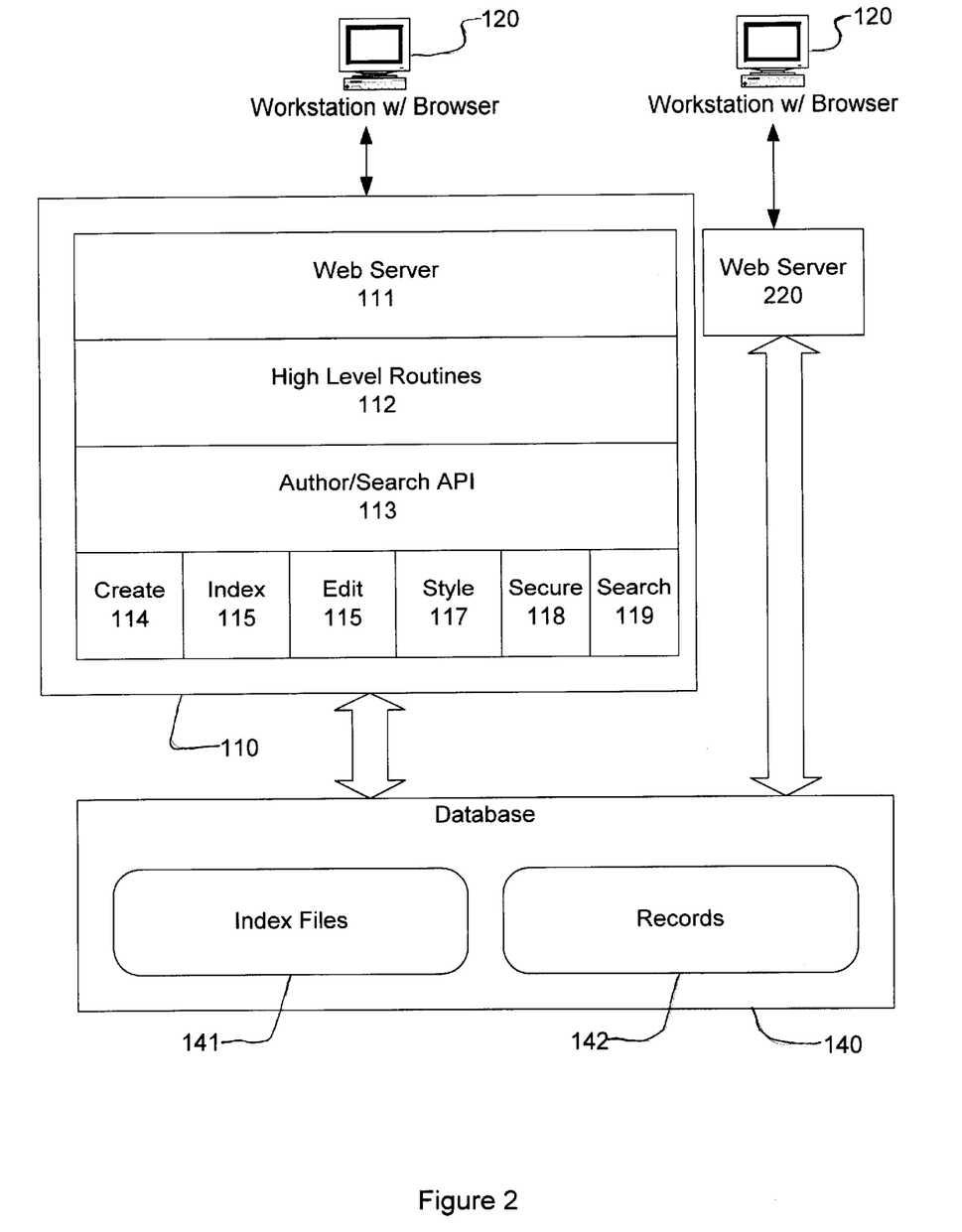
FIG. 2 is a bock diagram showing an architecture of an embodiment of a database management system in accordance with the invention.

Referring now to FIG. 2, there is shown a bock diagram showing an architecture of an embodiment of a database management system in accordance with the invention. The database 140 may be accessed through at least two avenues—either the database management server 110 or via general purpose hypertext document access software, such as Web server 220. The database 140 preferably comprises plural records 142 and index files 141 for optimized search and retrieval of the records 142.

The records 142 are comprised of one or more hypertext documents with embedded attributes, as discussed further below. Preferably, the documents comprising records 142 are HTML documents. The term "record" when used in describing an aspect of the invention should be understood to mean one or more related hypertext documents. The hypertext documents of a record are related at least logically, and preferably there is some hyperlinking between at least one of the documents of the record and the other documents of the record.

Because the records 142 are comprised of hypertext documents, the database 142 is accessible through general purpose hypertext document access tools such as Web server 220. Using the workstation 120 having a Web browser, the records 142 can be accessed and viewed, just like any other documents on the Web. This also demonstrates the availability of numerous other off-the-shelf tools which can be used to create, access, manage and edit HTML documents.

Although general purpose hypertext document access tools may be used to access the database 140, the database is preferably accessed through and maintained by the database management server 110. The database management server 110 comprises programs for securing and maintaining the database 140. At a first layer 111, the database management server 110 includes an interface to the workstations 120. This interface is preferably a web server. Below the first layer 111, a second layer 112 includes high level routines that provide the basic functionality available to the users at workstations 120. These high level routines are discussed further below, and include functions such as "create database" and "create record." In a third layer 113 below the second layer 112, there is an author/search API. The author/search API 113 comprises a library of routines, preferably written in C/C++. These routines provide a generic software interface to low-level routines 114–119.

The low-level routines 114–119 include routines for creating the database 114, a content indexer 115, editing the database 116, a page styler 117, securing the database 118, and searching the database 119. The content indexer 115 automatically builds XML index files and HTML search forms from the records 142. The page styler 117 manages page composition, layout and style for the documents which comprise the records 142. The security module 119 preferably protects individual pages for authorized access by users and user groups.

It will be appreciated that this four-layer approach is just one of many possible designs for the database management server 110. Although this approach provides certain benefits, it is not necessarily considered to be superior to all others, and includes a number of compromises beneficial in some embodiments but possibly not others. For example, the author/search API 113 may be used by other programs to use some of the low-level routines 114–119.

By using HTML documents as the primary data format, many things happen that improve the authoring and retrieval process of complex data. First, the database management system provides better performance because there is no need to create HTML from database tables. Second, the database management system provides increased flexibility because users are not limited to structured data models. Third, all of the data is managed in one open HTML format, not several proprietary ones. This results in dramatically reduced production and maintenance costs.

Figure 3:
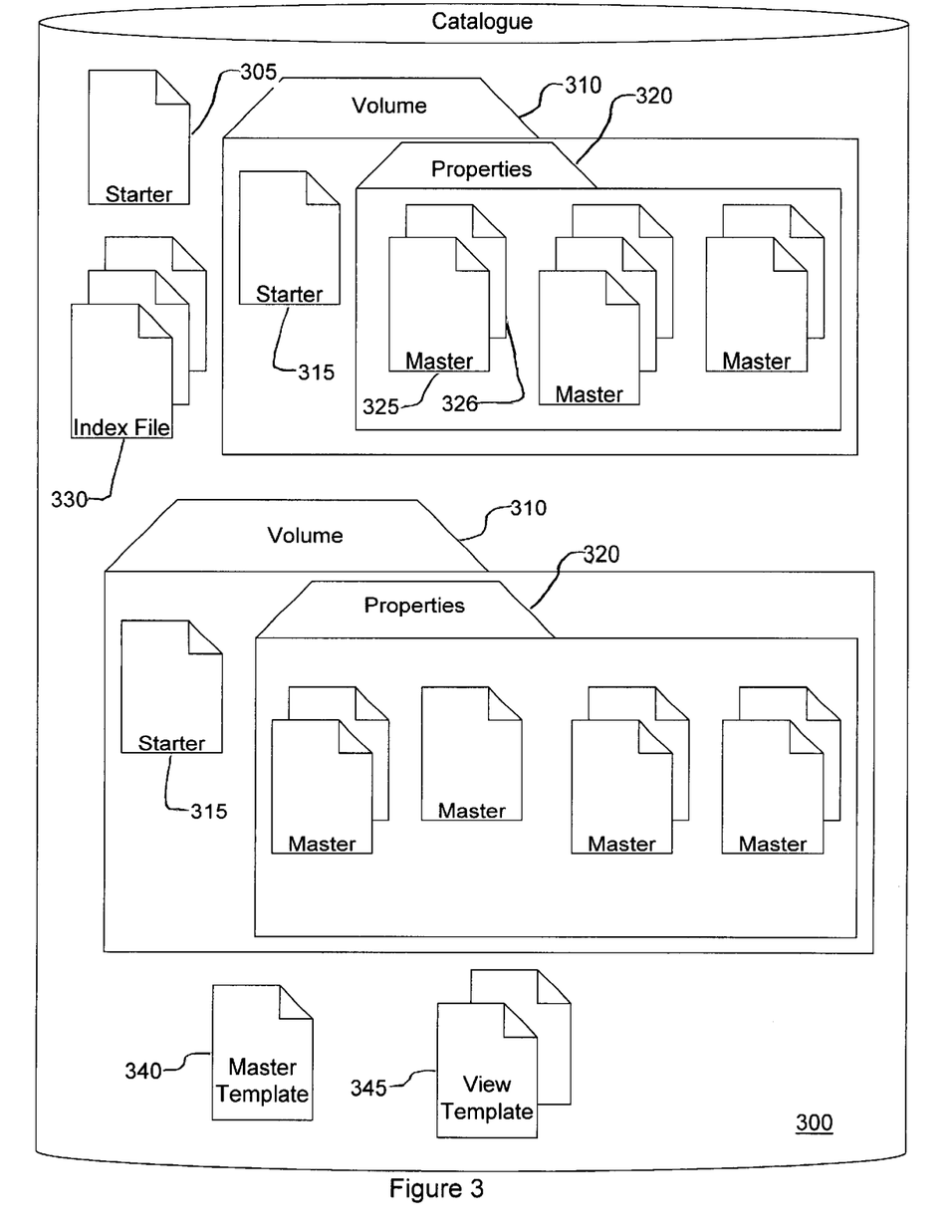
FIG. 3 is a block diagram of a generic file system layout in accordance with one aspect of the invention.

Referring now to FIG. 3, there is shown a block diagram of a generic file system layout in accordance with one aspect of the invention. The highest level of organization in the database 140 is the "catalog" 300. In most embodiments, there will be a single catalog for the entire organization. The catalog will typically be named after the organization. However, in some embodiments it may be desirable to provide a number of catalogs, each having a logical purpose. The catalog 300 preferably consists of a folder in a file system.

Within the catalog 300, there are a number of "volumes" 310. The database management server 110 preferably creates the volumes in accordance with the instructions of a system administrator. The database management server 110 preferably names the volumes in accordance with a predefined naming convention. Preferably, the volume names consist of "vol" plus a number. The volume names are preferably numbered in sequence as the volumes 310 created. Each volume 310 preferably consists of a folder stored within the catalog 300. The system administrator creates the volume structure, and decides what data goes in each volume 310. Volumes 310 are logical groups of data. The system administrator may choose to have only a single volume 310. A materials database might have volumes described as and used respectively for metals, rubbers, plastics, composites, ceramics and organics, named "vol1," "vol2," "vol3," "vol4," "vol5" and "vol6" respectively. An electronics components database might have volumes described as and used respectively for transistors, inductors, memories, switches, and LEDs, named "vol1," "vol2," "vol3," "vol4," and "vol5" respectively.

Within each volume 310, there is preferably another folder called "properties" 320. The properties folder 320 stores the records 142 for the respective volume 310.

As mentioned above, each record comprises one or more hypertext documents. Each record consists at least of a master document 325. The master document 325 stores all of the data for the record. Each record preferably also comprises plural view documents 326. Each view document 326 stores a subset of the data for the respective record, plus display formatting instructions for the data stored in the view document. If a record includes view documents 326, then the respective master document 325 preferably includes hyperlinks to those view documents 326. By formatting the master documents and view documents in HTML, they may be displayed as web pages using a web browser. Furthermore, the master documents and view documents can include hyperlinks to other files and can cause other files to be displayed, either as a single web page, compound pages, or in daughter windows.

Normally, all or almost all records in a given volume 310 will have the same number and format of view documents 326. Preferably, the database management server 110 attends to this. This differs somewhat from FIGS. 3 and 4, which shows the records in each volume having different numbers of view documents.

The database 140 preferably includes several additional files which enhance navigation of and access to the master documents 325 and view documents 326. Within the catalog 300, there is a catalog "starter" document 305. Preferably, the catalog starter document 305 is in hypertext (e.g., HTML) format and named "index.html." This naming convention complies with standard naming conventions for web sites. The catalog starter document 305 comprises an index to the volumes 310, and preferably includes the descriptions of the volumes.

Figure 8:
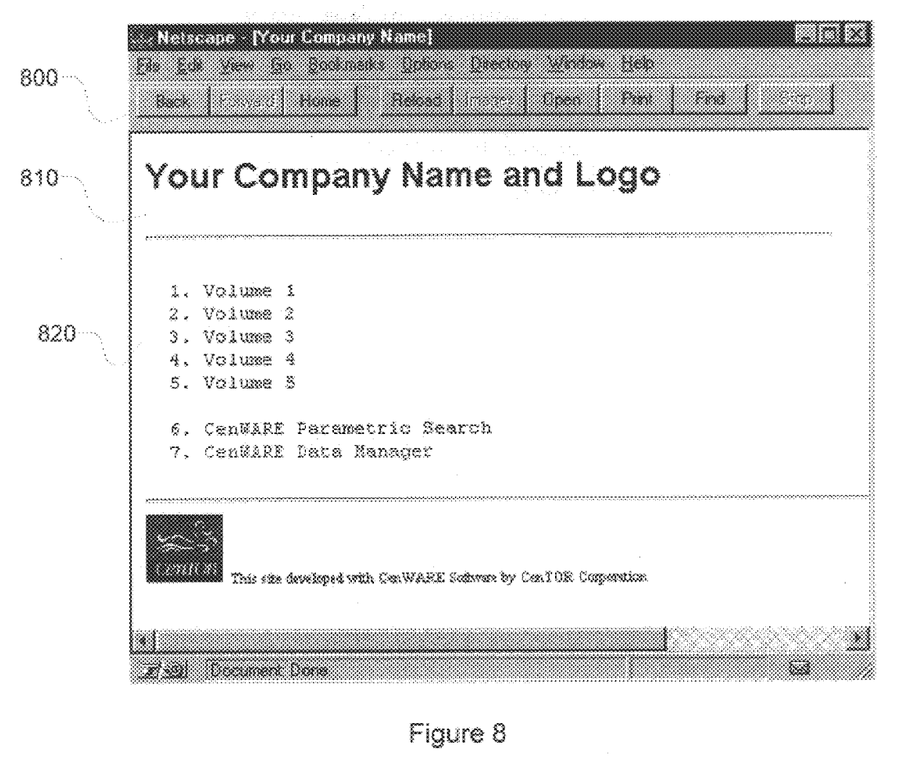
FIG. 8 is a screen shot of a display of a catalog starter document.

FIG. 8 is a screen shot of a display of a catalog starter document. The display shows a browser window 800. The web page display area of the browser window 800 includes the catalog name 810 and the volume names 815.

Each volume 310 preferably also includes a respective starter document 315. Preferably, the volume starter document 315 is in hypertext (e.g., HTML) format and named "index.html." The volume starter document 315 for a given respective volume 310 comprises an index to the records in the given respective volume 310. The catalog starter document 305 and the volume starter document correspond to "home pages" for the catalog and volumes, respectively.

Figure 9:
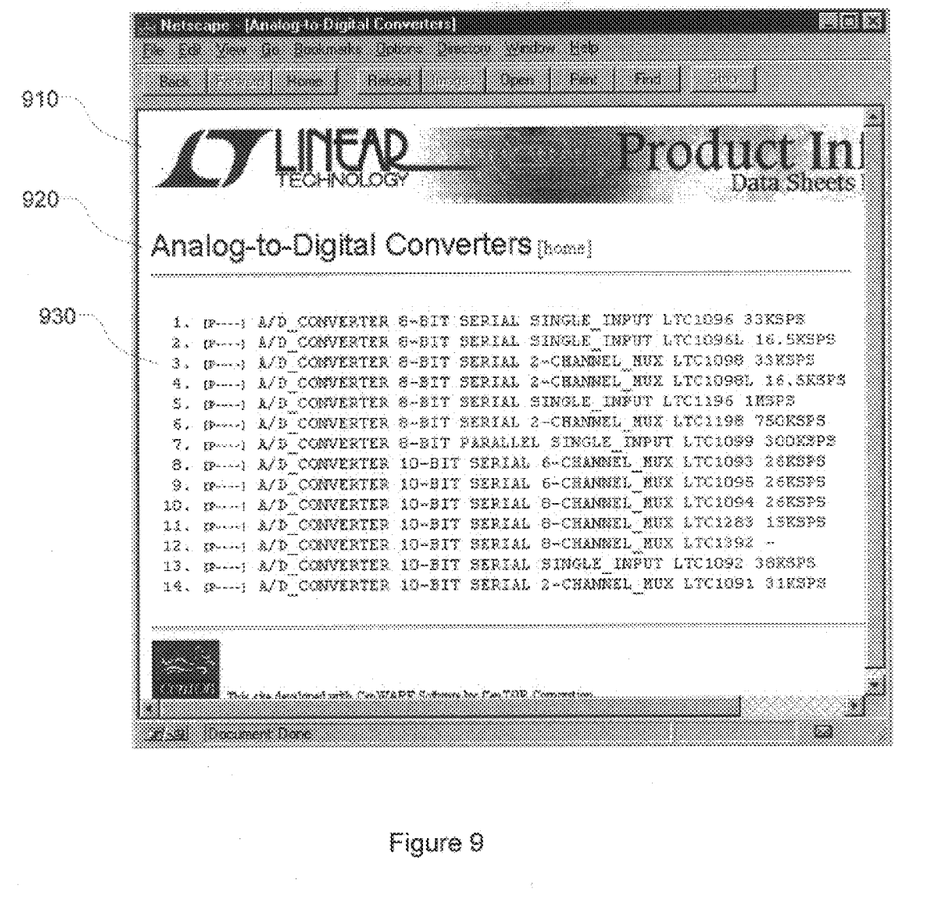
FIG. 9 is a screen shot of a display of a volume starter document.

FIG. 9 is a screen shot of a display of a volume starter document. The displayed web page includes the name of the catalog 910 and the name of the volume 920 in a top frame. In a middle frame 930, thumbnail or abbreviated views of the records are shown. If there are a large number of records, the volume starter document could include paging controls to allow the user to page through the list of records. Although FIG. 9 only shows a single volume, the page could also be designed to include hyperlinks to the other volume starter documents 315 and to the catalog starter document 305.

Preferably, the database management server 110 generates and maintains the catalog starter document 305 and the volume starter documents 315. The displayed appearance of the starter documents may be easily designed and edited using standard HTML or hypertext editing tools. Thus, they may include graphics, animation, sound video, embedded programs (e.g., Java, ActiveX controls), etc. This ability to use standard web page techniques directly in the views of the records dramatically increases the utility of the database management system of the invention.

The database 140 preferably includes a number of templates 340, 345. These templates 340, 345 may be created by the system administrator, or may come pre packaged. When a new record is created, the database management server 110 stores the data in a master document 325 in accordance with the master template 340. The database management server 110 also creates view documents 326 having the format of the respective view templates 345 and storing data.

The database management server 110 preferably automatically names the master and view documents. The database management server 110 preferably names the master and view documents according to their virtual position document within the database 140. More preferably, the database management server 110 numbers each new master document within a volume sequentially (e.g., 00001.htm, 00002.htm, 00003.htm, etc.). View documents 316 preferably are assigned the name of the respective master document 325, plus a dash and a sequence number (e.g., 00001-1.htm, 00001-2.htm, 00001-3.htm for three views of the same record).

Figure 4:
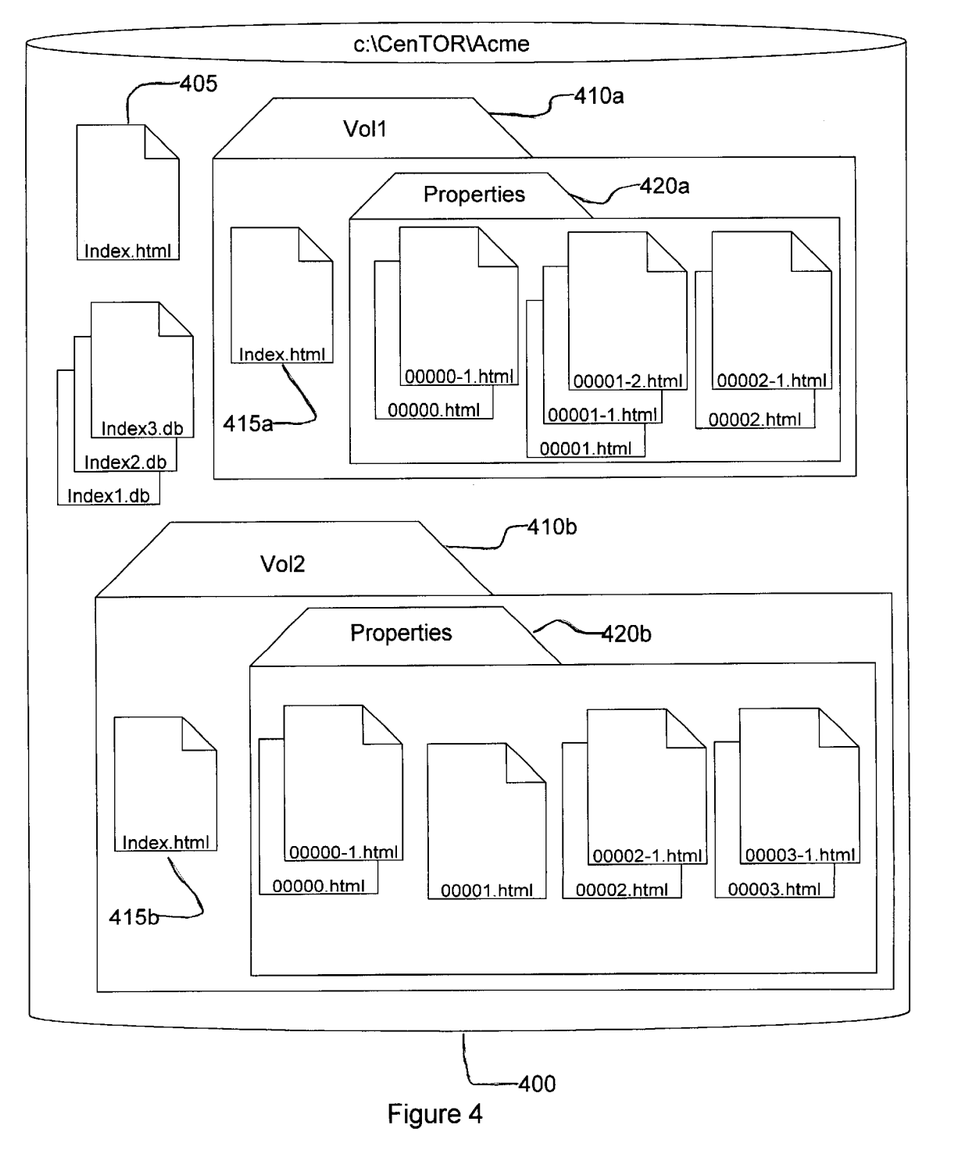
FIG. 4 is a block diagram of an exemplary file system layout in accordance with one aspect of the invention.

Referring now to FIG. 4, there is shown a block diagram of an exemplary database having a file system layout in accordance with one aspect of the invention. FIG. 4 shows a catalog 400 named "Acme" which is located on a hard drive at C:\CenTOR. The catalog 400 has two volumes 410a, 410b, named "vol1" and "vol2."

Within the Properties folder 420a of vol1, there are three records. The first record is comprised of a master document named "0000.html" and a view document named "00000-1.html." The second record is comprised of a master document named "00001.html" and two view documents named "00001-1.html" and "00001-2.html." The third record is comprised of a master document named "00002.html" and a view document named "00002-1.html."

Within the Properties folder 420b of vol2, there are four records. The first record is comprised of a master document named "00000.html" and a view document named "00000-1.html." The second record is comprised of a master document named "00001.html" but no view documents. The third record is comprised of a master document named "00002.html" and a view document named "00002-1.html." The fourth record is comprised of a master document named "00003.html" and a view document named "00003-1.html."

It can be seen that the volumes, master documents and view documents have consistent and predictable names. The structure of the database in accordance with the invention, in conjunction with such a naming convention, provides considerable benefits as described above. Without a doubt, there are considerable benefits to storing records in HTML documents in a hierarchical file system.

Methods of the Invention

Figure 5:
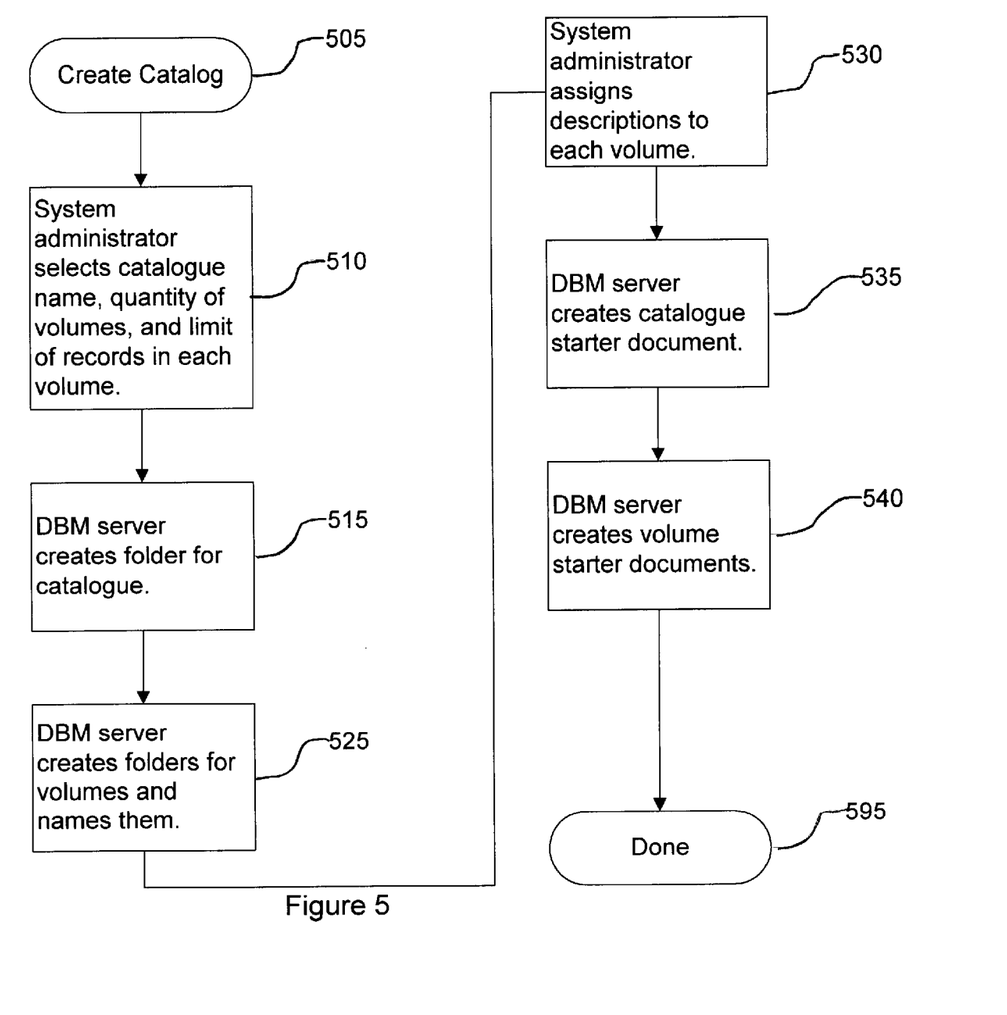
FIG. 5 is a flow chart of a method of creating a database catalog.

Referring now to FIG. 5, there is shown a flow chart of a method of creating a catalog 300. In a first step 510, a system administrator selects a first name for the catalog 300. Preferably, the system administrator selects a quantity of volumes 310 for the database 140 at this time, and a limit for the number of records in each volume 310. Preferably, the database management server 110 includes tools to allow the system administrator to later change the number of volumes 310, and to add or delete volumes 310.

Next, the database management server 110 creates the basic framework of the catalog 300. This includes creating a folder in the file system for the catalog 300, and names the catalog 300 with the name selected by the system administrator (step 515). Then, based upon the quantity of volumes 310 selected by the system administrator, the database management server 110 then creates the same quantity of folders within the catalog folder for the volumes 310 (step 525). At this time, the database management server 110 preferably also names the volume folders in accordance with the volume naming convention described above.

The system administrator preferably can also assign descriptions to the volumes 310, as described above. This is normally done directly after the volumes 310 are created (step 530). However, the database management server 110 preferably includes tools to allow the system administrator to later change the volume descriptions.

As part of the process of initially creating the catalog 300 and the volumes 310, the database management server 110 preferably also automatically creates a catalog starter document 305 (step 535). This is also a good time for the database management server 110 to create volume starter documents 315 (step 540). At this point, the basic framework of the database 140 is formed (step 595).

Figure 6:
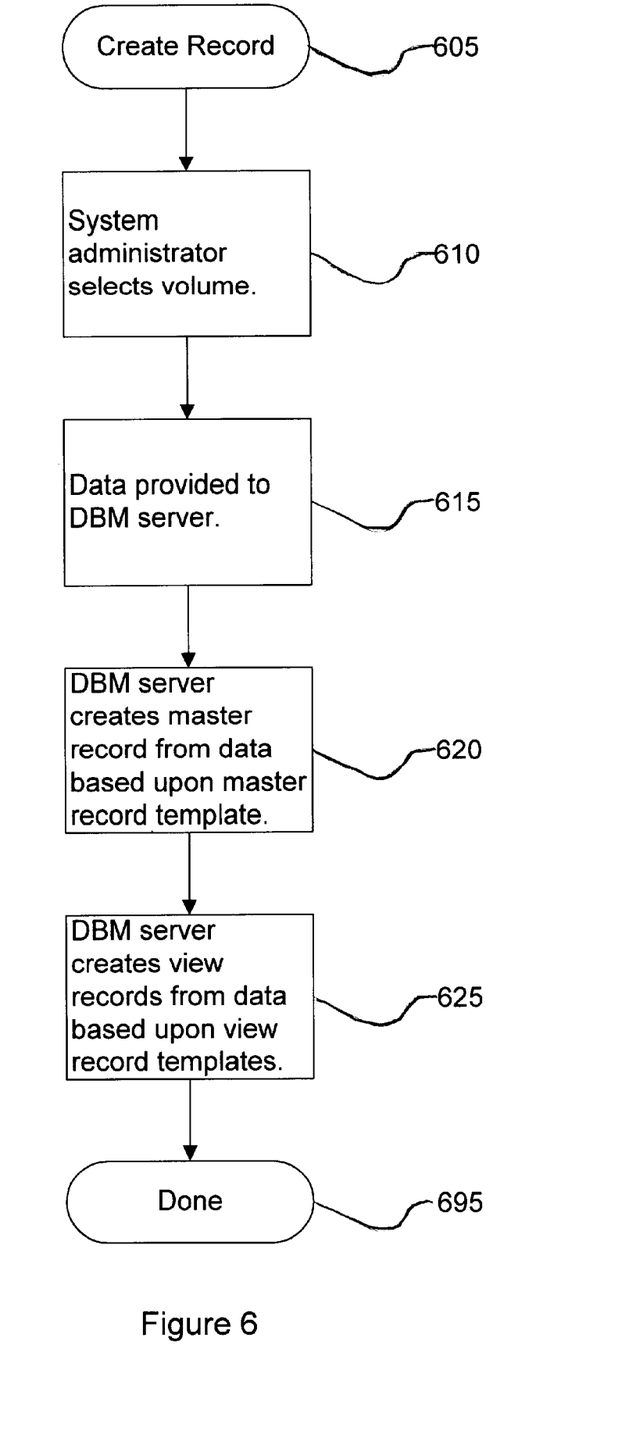
FIG. 6 is a flow chart of a method of creating a database record.

With the framework of the database 140 created, the system administrator and/or users can create the database records. Referring now to FIG. 6, there is shown a flow chart of a method of creating a database record.

In a first step 610, a volume 310 is selected for storing the record. This may be done manually or automatically. Preferably, the database management server 110 provides web pages which permit human selection of volumes 310. Thus, it can be seen that the database 140 integrates directly with the programs which manage the database—in a sense, the database 140 and database management server 110 are organic.

In the next step 615, the database management server 110 receives data for the record. The database management server 110 may receive the data in numerous ways well known in the art. For example, a user could enter the data by hand through a user interface. The data could also be imported and translated from a external data source. The data could be obtained through an extraction tool from on-line documents. The source of the data is not important.

In the next steps, the database management server 110 creates the record. Although the database 140 could include just master documents, the benefits of the invention are obtained through the use of view documents 326. The database management server 110 creates the master document 325 (step 620) by first obtaining a master document "template" 340 and then creating the master document 325 from the master document template 340.

Preferably, the system administrator defines a number of document templates 340, 345 for both the master document 325 and view documents 326. These templates 340, 345 are then used by the database management server 110 to automatically create master documents 325 and view documents 326. The templates 340, 345 are preferably hypertext documents with markers to indicate where to place data specific to the record. Thus, the process of creating a document 325, 326 from a template 340, 345 is a simple matter of copy and replace. Preferably, the templates 340, 345 are saved in the catalog, or templates 340, 345 which are specific to a given volume 310 are saved in that volume.

Next, the database management server 110 uses the view document templates 345 to create the view documents 326 (step 625). It is possible that there may be fields in the master record 325 with no data. This may result in there being view documents 326 with no data. At this point, the record is created (step 695).

The use of template documents adds a further layer of predictability to the database of the invention. Furthermore, template documents take into account the fact that most users will want to view the data of a record in a limited number of formats. In most prior art database management systems, when a user wishes to view data, the data is obtained from the database and formatted according to the user's wishes. In contrast, in the present invention the view formats are pre-defined as template documents, and the appropriate view document is simply displayed. This eliminates the need to format the view each time the user wishes to view a document. Although a database in accordance with the invention might occupy extra space, the speed of display and extra benefits of the hypertext format (especially HTML) justifies the extra storage space needed. In fact, as the view formats become more complex, the benefit of having view documents increase.

Figure 7:
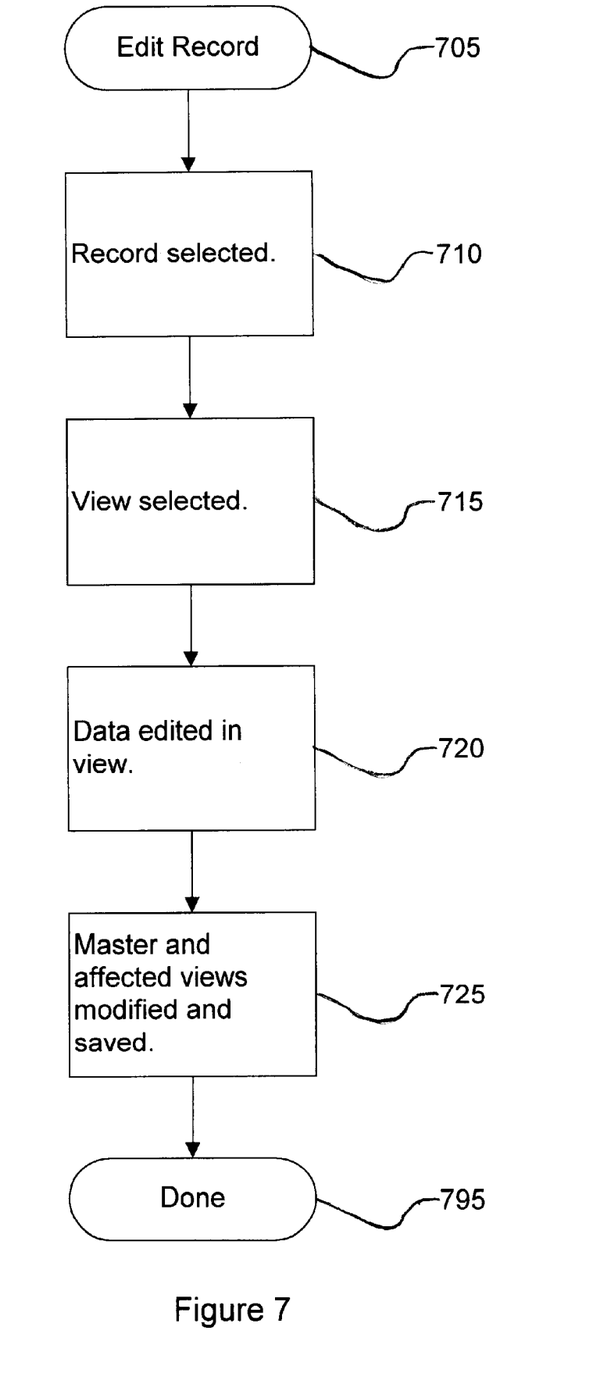
FIG. 7 is a flow chart of a method of editing a database record.

Referring now to FIG. 7, there is shown a flow chart of a method of editing a database record 142. To edit a record 142, the record 142 is first selected (step 710). A record 142 may be selected for editing manually or automatically. Next, a view 326 of the record 142 is selected, so that the corresponding view document 326 is displayed (step 715). Next, the data in the view 326 is edited (step 720). After the data has been edited, it can be saved. This involves revising the master document 325 and any view documents 326 which are affected by the change (step 725). Accordingly, the editing is complete (step 795).

In addition to record creation and editing, the database management server 110 includes other tools and functions common in DBMSes. For example, the database management server 110 preferably includes delete, archive, export and reporting capabilities. In contrast to views of records, reports are generated upon user request and summarize data from multiple documents.

The database of the invention is particularly suited to environments wherein the database is very large, the records in the database are read often, but perhaps the database is revised less often. It is particularly suited to environment wherein the records of the database are frequently viewed individually, and there are a number of pre-defined formats in which the users of the database may wish to view the records.

The present invention provides a number of benefits. Doing all user access in a web browser provides lower cost of ownership. Because all the processing is done on the server, there is single-source control. Because all of the data is stored in hypertext files (e.g., HTML/XML), the data is more easily exchanged.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A database comprised of hypertext documents stored on a computer-readable medium and used in conjunction with a database management server, the database management server comprising programs for securing and maintaining the database, the database comprising:
   a) a named catalog, the catalog comprising a folder in a file system on the computer-readable medium;
   b) plural named volumes created by the database management server, the volume names being generated by the database management server, each volume comprising a folder stored within the catalog;
   c) plural records comprising documents stored in the volumes, each record comprising one or more documents, said documents not being required to be stored in database tables, at least one record comprising a master document and at least one view document,
      i) the master document storing a view format for the at least one view document and all of the data for the record, the view format comprising a template document, the template document for pre-formatting the data for viewing;
      ii) the view document storing at least some of the data for the record and displaying formatting instructions for the data stored in the view document;
   d) a catalog starter document in the catalog, the catalog starter document generated by the database management server and comprising an index to the volumes; and
   e) volume starter documents in plural respective volumes, the volume starter document for a given respective volume comprising an index to the records in the given respective volume, the volume starter documents being generated by the database management server.

2. The database of claim 1 wherein the volumes include respective properties sub-directories, and the records for the volumes are stored in the properties sub-directories.

3. The database of claim 1, wherein the database management server names each new volume based upon the volume name of a last-added volume in the catalog plus a sequence number.

4. The database of claim 1, wherein the database management server names each new record based upon the name of a last-added record in the corresponding volume plus a sequence number.

5. The database of claim 1 wherein the master documents and the view documents are hypertext documents.

6. The database of claim 1 wherein the catalog starter document and the volume starter documents are hypertext documents.

7. A database management system operative in a computer having an operating system and a hierarchical file system, the database management system comprising a database management server, and a database:
   a) the database comprising:
      i) a named catalog, the catalog comprising a directory of a file system on the computer-readable medium;
      ii) plural named volumes created by the database management server, the volume names being generated by the database management server, each volume comprising a folder stored within the catalog;
      iii) plural records comprising documents stored in the volumes, each record comprising one or more documents, said documents not being required to be stored in database tables, at least one record comprising a master document and at least one view document, (1) the master document storing a view format for the at least one view document and all of the data for the record, the view format comprising a template document, the template document for preformatting the data for viewing;

(2) the view document storing at least some of the data for the record and display formatting instructions for the data stored in the view document;

iv) a catalog starter document in the catalog, the catalog starter document generated by the database management server and comprising an index to the volumes;

v) volume starter documents in plural respective volumes, the volume starter document for a given respective volume comprising an index to the records in the given respective volume, the volume starter documents being generated by the database management server; and b) the database management server comprising computer program instructions for creating, editing and deleting volumes, and creating, editing and deleting records.

8. The database management system of claim 7, wherein the volumes include respective properties subdirectories, and the records for the volumes are stored in the properties sub-directories.

9. The database management system of claim 7, wherein the database management server names each new volume based upon the volume name of the last-added volume in the catalog plus a sequence number.

10. The database management system of claim 7, wherein the database management server names each new record based upon the name of the last added record in the corresponding volume plus a sequence number.

11. The database management system of claim 7, wherein the master documents and the view documents are hypertext documents.

12. The database management system of claim 7, wherein the catalog starter document and the volume starter documents are hypertext documents.

13. A method of creating a database record comprising one or more related documents in a database comprising:

a) providing a database management server comprising programs for securing and maintaining the database;

b) providing a hierarchical file system comprising plural folders representative of a hierarchy for the database, the hierarchy of folders including one or more volume folders, the database management server naming the volume folders in accordance with a volume naming convention, at least one volume folder for containing at least a database record;

c) the database management server receiving data for the database record; and d) the database management server creating the database record comprised of a master document and plural view documents, said documents not being required to be stored in database tables, comprising:

i) selecting a folder for storing the master document and the view documents;

ii) obtaining a master document template;

iii) creating the master document from the master document template, the master document including all of the data for the database record;

iv) obtaining plural view document templates, the view document templates including fields;

v) creating the view documents from the view document templates, each view document including data for the database record corresponding to the fields, if present; and vi) the database management server creating and storing a view format for at least one view document in the master document, the view format comprising a pre-defined template document for pre-formatting the data for viewing.

14. The method of creating a database record in a database of claim 13 wherein the master document and the view documents are hypertext documents.

15. An open format database comprised of open format documents stored on a database management server, the database management server comprising programs for securing and maintaining the database, the database comprising:

a) a catalog, the catalog comprising volume information about one or more volumes stored in the open format database, the catalog comprising a folder in a file system on the computer-readable medium;

b) plural volumes, each volume having a volume name, the volume names being generated by the database management server, the volumes comprising one or more folders stored within the catalog, the volumes each comprising record information about one or more records stored in the volume, the volume information to index the volumes;

c) plural records, each record comprising one or more open format documents, said documents not being required to be stored in database tables, the record information to index the records;

i) the record information further comprising view format information for at least one of the open format documents, the view format information comprising a pre-formatting template for pre-formatting the data for viewing;

ii) the at least one open format document storing at least some of the data for at least one record and display formatting instructions;

d) a catalog starter document in the catalog comprising an index to the volumes; and e) volume starter documents in the plural respective volumes, each volume starter document for a given respective volume comprising an index to the records in the given respective volume.

16. The open format database of claim 15, wherein the catalog further comprises a first folder in a file system, the first folder to store the volume information.

17. The open format database of claim 16, wherein the volume further comprises a second folder in the file system, the second folder stored within the first folder, the second folder to store the records.

18. The open format database of claim 15, wherein the open format comprises hypertext format.

19. The open format database of claim 18, wherein the hypertext format comprises XML format.

20. The open format database of claim 18, wherein the hypertext format comprises HTML format.

21. The open format database of claim 15, wherein the record further comprises a master document and at least one view document, the master document comprising first data stored in the record, the view document comprising second data stored in the record and transformation information, wherein the second data comprises a subset of the first data.

22. The open format database of claim 21, wherein the transformation information comprises the display formatting instructions.

23. The open format database of claim 21, wherein the view document comprises a pre-generated view document.

24. The open format database of claim 21, wherein the view document comprises a dynamically generated view document.

25. The open format database of claim 21, further comprising a master template, the master template to generate the master document.

26. The open format database of claim 21, further comprising a view template, the view template to generate the view document.

27. The open format database of claim 15, wherein the database is stored in volatile storage.

28. The open format database of claim 27, wherein the volatile storage comprises random-access memory (RAM).

29. The open format database of claim 15, wherein the database is stored in non-volatile storage.

30. The open format database of claim 29, wherein the non-volatile storage comprises a hard disk.

* * * * *

UNITED STATES PATENT AND TRADEMARK OFFICE
CERTIFICATE OF CORRECTION

PATENT NO.    : 6,654,737 B1
DATED         : November 25, 2003
INVENTOR(S)   : Chris Nunez It is certified that error appears in the above-identified patent and that said Letters Patent is hereby corrected as shown below:

<u>Column 2,</u>
Line 15, change the word "computerassisted" to the word -- computer-assisted --.

<u>Column 7,</u>
Line 45, change "0000.html" to -- 00000.html --.

<u>Column 11,</u>
Line 9, change the word "preformatting" to the word -- pre-formatting --.

Signed and Sealed this

Sixteenth Day of March, 2004

JON W. DUDAS
*Acting Director of the United States Patent and Trademark Office*